Nov. 21, 1961 E. BRICHARD 3,009,690
RECOVERY OF HEAT FROM THE FUMES OF INDUSTRIAL FURNACES
Filed Jan. 10, 1958 2 Sheets-Sheet 1
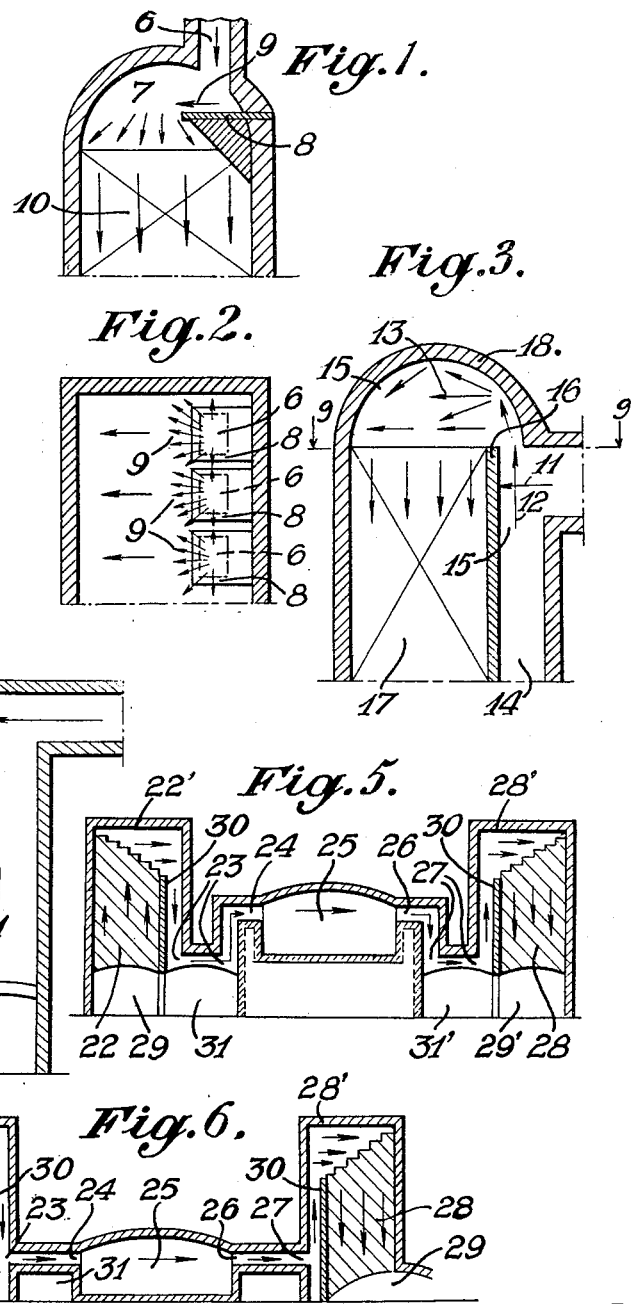
INVENTOR
EDGARD BRICHARD
ATTORNEYS Nov. 21, 1961     E. BRICHARD     3,009,690
RECOVERY OF HEAT FROM THE FUMES OF INDUSTRIAL FURNACES
Filed Jan. 10, 1958     2 Sheets-Sheet 2
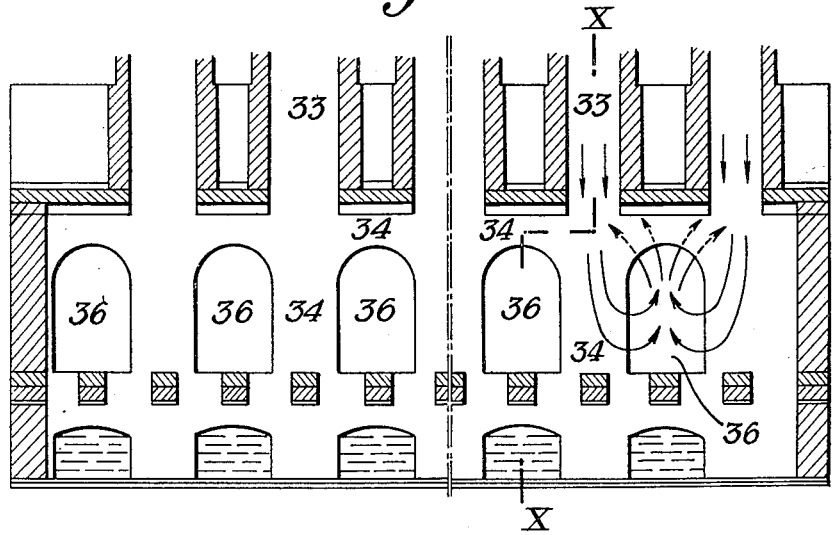
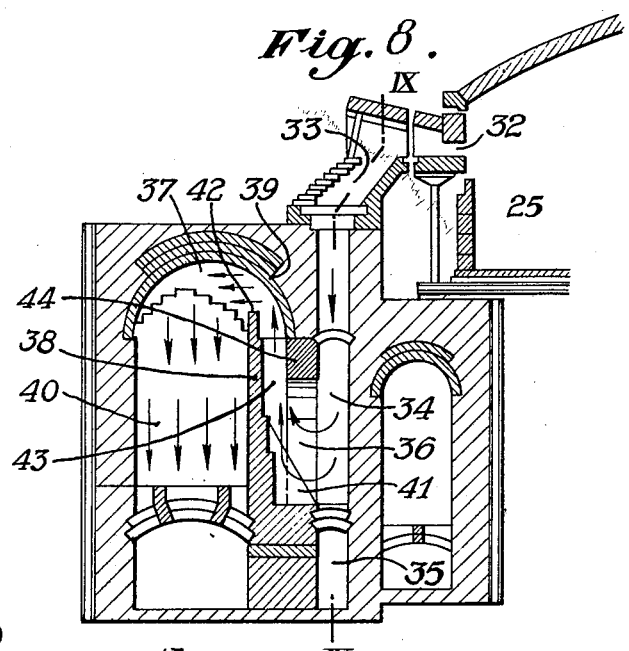
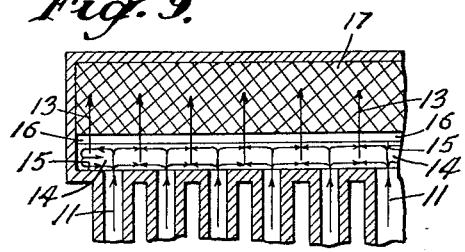
INVENTOR
EDGARD BRICHARD
Corey, Hart & Stemple
ATTORNEY

United States Patent Office

3,009,690
Patented Nov. 21, 1961

1

3,009,690
RECOVERY OF HEAT FROM THE FUMES OF INDUSTRIAL FURNACES
Edgard Brichard, 159 Chaussee de Gilly, Jumet, Belgium
Filed Jan. 10, 1958, Ser. No. 708,144
Claims priority, application Belgium Jan. 29, 1957
20 Claims. (Cl. 263—19)

The present invention relates to a process and an apparatus for the recovery or regeneration of the heat carried along by the fumes of industrial furnaces such as, in particular, glass work furnaces.

In this connection regenerators have been proposed which comprise chambers having refractory materials stacked therein to form multiple open-work checker-work systems. The hot fumes and the incoming air to be heated are respectively arranged to circulate alternately along different circulation paths.

The use of such hitherto proposed regenerators have usually had the disadvantage that a uniform distribution of the gases in the regenerators was not obtained. Furthermore construction of such regenerators, especially in the case of multiple burner furnaces, has generally had to satisfy certain conditions which are detrimental and do not lend therselves to a good distribution of the burners in the furnace and to the adequate utilization of the available space.

Thus the fumes which issue from the multiple burners of the furnace travel towards the checker-work system through a corresponding number of ducts which open into the checker-work chamber through apertures which are separated from one another by projections of masonry. From each duct, a fume jet or current is directed towards and through the checker-work system. This jet or current reaches the checker-work system before it has been able to expand sufficiently to encompass the cross-sectional area of the system. In consequence therefore the portions of this area situated opposite the projections are substantially not contacted by the entering fume jets or currents.

It is an object of the present invention to provide a process and an apparatus for the recovery or regeneration of the heat carried along by the fumes of industrial furnaces such as, in particular, glass works furnaces, in which these disadvantages are substantially reduced or overcome.

According to one aspect of the invention there is provided a process for the recovery of heat from discrete fume currents emitted from an industrial furnace including the step of joining said discrete currents into a single substantially continuous sheet of fumes and directing said sheet on to substantially the entire exposed entry surface of a refractory checker-work system.

According to another aspect of the invention there is provided apparatus for the recovery of heat from discrete fume currents emitted from an industrial furnace comprising a regenerator chamber having disposed in it a refractory checker-work system, means for directing said fume currents into said regenerator chamber and at least one deflecting surface disposed within said chamber in the path of travel of said fume currents for deflecting said currents into a continuous sheet of fumes arranged to cover substantially the entire exposed surface area of said checker-work system.

2

The application of the present invention to the problem of the recovery of heat of the emitted fumes can involve the spreading out of the discrete fumes before they enter the checker-work system into a continuous sheet of fumes disposed along the whole length of the exposed entry surface of the checker-work. This is done by breaking up the jets or currents of fumes, before, after, or at the moment of their entry into the checker-work chamber, by projecting them against surfaces directed obliquely or perpendicularly to the direction of travel of the fumes. The distribution or spreading out of the fumes may take place correspondingly in a transverse direction with respect to the entry surface of the checker-work. This is achieved by projecting the jets of fumes on to a wall which is situated in the checker-worker chamber and lying in a plane which is at least oblique or perpendicular to the direction of travel of the fumes at their entry into the checker-work chamber. The jets of fumes are dispersed at this wall and spread out fanwise, overlapping one another to form a continuous layer or sheet.

If one attempts to obtain a good distribution of the fumes transversely to the checker-work by increasing the volume of the free space above the checker-work system proper, the result is either a loss of space available for the checker-work itself or else an increase in the external volume occupied by the chambers, with a consequent increase in the external heat losses.

It is therefore more expedient to shape the space above the checker-work so that the transverse distribution of the fumes in that region is as uniform as possible. In practice the arrangement is for the sheet of fumes to arrive at the checker-work system in a direction substantially perpendicular to that which the fumes take when entering the checker-work. This is effected by giving the space above the checker-work a cross-section which decreases in the direction of travel of the fumes.

The fumes may first of all pass into a dust removing chamber which is separated from the checker-work system, and at the bottom of which the dust and reaction products are collected.

Thus, the untreated fumes carry along particles of substances treated in the furnace or vapours coming from these substances. These, by reacting upon contact with the hotter parts of the checker-work system, give rise to the formation of vitreous slag which trickles downwards, gradually cooling and solidifying as it descends and finally blocking up the checker-work system. This grave disadvantage can be obviated according to the invention by leading the fumes first of all through an expansion and dust removing chamber separated from the checker-work chamber. A large proportion of the dust is then deposited at the bottom of this chamber where it is collected in the form of dust and slag.

This dust removing chamber may also be so arranged that the dust is finally eliminated from the fume circuit and at the same time the condensable vapours contained in the fumes can react with the materials of the dust removing chamber so as to flow out in the form of a vitreous liquid which collects at the bottom of the said chamber where there is provided a reservoir isolated from the checker-work and from the dust removing chamber, in which the slag collects and from which it can be subsequently removed in the liquid state.

The dust extracting is substantially improved according to the invention by causing the fumes to flow in fairly thin streams which are subjected to multiple changes of direction.

The dust extracting chamber may be either common to all the burners or may be partitioned so as to separate each of them or group some of them so as to facilitate individual or group regulation as required.

It is also desirable that in that part of the construction where the gases and the walls are at a high temperature, the path of travel of the fumes should be as sinuous as possible. At high temperatures, the transmission of heat in fact takes place at a very considerable intensity. The fumes enter the regeneration circuits at a temperature which may be as much as 1550° C., whilst they emerge therefrom sometimes below 400° C.

In certain constructions, there may be a direct loss through radiation of the heat of the fumes or from parts of the flues washed by the fumes at their maximum temperature, these parts of the flues being, on the contrary, at the lowest temperature.

According to the invention the fumes are made to follow sinuous paths of travel in order that the heat transmitted by radiation should be arrested or better still reflected at numerous points. In this way the external losses of heat are considerably reduced.

These variations in direction will advantageously be brought about by circulation successively in the downward direction, upwards and then downwards once again. It is also desirable to include at least one change of direction in the longitudinal and/or transverse directions of the furnace.

It is also desirable to be able, at will, either to separate or to mix the fumes from different burners.

Certain burners, corresponding to the zones of the furnace where the most elevated temperatures prevail give off fumes which are extremely hot and which can locally overheat the checker-work, wearing it out prematurely and thus limiting the maximum working life which the furnace can have before it has to be repaired, whilst, on the other hand, other parts of the checker-work are penetrated by fumes which are too cool and, therefore, cannot adequately heat the checker-work and in consequence the air which passes through the checker-work when the gas currents are reversed.

According to the invention, however, these disadvantages are effectively mitigated by mixing the hottest fumes with cooler fumes before the mixed fumes enter into contact with the checker-work system.

The mixing itself may be of a rudimentary nature: all the burners delivering fumes into a common chamber where they are mixed by diffusion, following paths of travel which are alternately common and then separate, but substantially parallel.

The mixing can be improved by creating sudden impacts between the jets or currents of fumes from different burners. The turbulence resulting from this also having the considerable advantage of improving the co-efficients of heat transfer by convection between gases and walls, which is particularly useful in the case of air, whose co-efficient of radiation, as is known, low.

According to the invention, this particular object is achieved by obliging the fumes issuing from the burners to follow such paths of travel as comprise at least one change of direction in a plane parallel to the longitudinal axis of the furnace, for example, by dividing the fume currents issuing from each burner into two component currents and causing each component current thus formed to meet, after a deviation through 90°, the nearest component current from an adjacent burner whereupon the component currents mix.

In furnaces where the working temperature is very high, it often happens that some parts of the substructure, which are incidentally subjected to considerable mechanical load, reach a temperature in the neighbourhood of their softening point. In these circumstances, it is often necessary to limit the working temperature of the furnace and the various circuits of the regeneration chambers to take into account the mechanical load to which the parts of the substructure in question are subjected. Thus to a greater extent than in known construction, some areas of masonry are vaulted in which the thrust is a multiple of the load supported. This limits the permissible working temperature to markedly lower values.

According to the invention, the walls of the air ducts from the burners, which walls are parallel to the longitudinal axis of the furnace, may be supported directly by solid walls, which are uninterrupted from the parts of the construction situated out of contact with the fumes and to the foundations; these walls being vertical or slightly inclined, can therefore be subjected to the highest working temperature.

Since the apertures which allow passage to the fumes and the air are situated at the regions subjected to little load, they may also be subjected to the highest temperatures, compatible with the nature of the materials used.

For a better understanding of the invention and to show how the same may be carried into effect, reference will now be made to the accompanying drawings, in which:

FIGURES 1 and 2 are respectively vertical cross-sectional and plan views of a first form of apparatus according to the invention, FIGURE 3 is a vertical cross-sectional view of a second form of apparatus according to the invention, FIGURE 4 is a vertical cross-sectional view of a third form of apparatus according to the invention, FIGURE 5 is a vertical cross-sectional view of a fourth form of apparatus in accordance with the invention, FIGURE 6 is a vertical cross-sectional view of a fifth form of apparatus in accordance with the invention, FIGURE 7 is a longitudinal sectional view of a sixth form of apparatus in accordance with the invention, FIGURE 8 is a cross-sectional view along the line X—X of the apparatus shown in FIGURE 7, and FIGURE 9 is a partial horizontal sectional view taken along the line 9—9 of FIGURE 3.

In a regenerator according to the invention and as illustrated in FIGURES 1 and 2 of the drawings, the fumes issuing from burners pass through the ducts 6 into a chamber 7 housing a checker-work system 10. The chamber or vestibule 7 has formed in it normally to the direction of the fume currents one or more baffle plates 8 against which these currents may be directed so as to be deflected and spread out in fan shape about the mouth of each duct 6 as shown by the arrows 9. The fume currents thus spread out over the whole exposed surface presented by the checker-work 10 and pass into the latter distributed substantially uniformly over its entire cross-section. In fact, the spreading out of the currents takes place in all directions about the mouths of the ducts 6, and in consequence the various fan-shaped currents overlap one another and so result in a very uniform distribution of the fumes both in the longitudinal and in transverse directions with respect to the exposed surface of the checker-work 10. Furthermore as a result of the impact of the fumes against the plates 8 a reduction in the mean speed of the fumes takes place and this further facilitates their uniform distribution.

Referring to FIGURES 3 and 9 of the drawings, there is here shown a regenerator in which the fumes issuing from the burners follow paths indicated by the arrows 11, 12 and 13 and impart successively three surfaces perpendicular to their direction of flow. These successive impacts promote the deposition of dust which is collected for the greater part at the bottom of a chamber 14 from which it is subsequently removed. Thus, in passing into a regeneration chamber 15 which houses a checker-work system 17, the fumes abut against a baffle wall 16 which serves to protect the checker-work 17. The effect of the impact against the wall 16 is to cause the fume currents to spread out thereby causing them to distribute along the length of the chamber 15. The thus spread out fume currents are obliged, due to the presence of the baffle wall 16, to pass in the form of substantially uniform sheets of fumes towards a vaulted wall 18, which in its turn, gradually guides them, turning them through 180°, towards the exposed surface of the checker-work 17, the fumes being thereby distributed substantially uniformly over the whole entry cross-section of the checker-work 17.

Referring to FIGURE 4 of the drawings, there is here shown a regenerator having a checker-work system 19 so shaped at its upper portion as to leave between a vaulted wall 20 of the enclosing checker-work chamber and the checker-work 19 itself a passage 20' which decreases in cross-section in the direction of flow of the fumes. This passage 20' assists in promoting the uniform distribution of the fumes already distributed by means of a baffle wall 21, into a series of juxtaposed fan-shaped currents which mutually overlap.

Referring to FIGURES 5 and 6 of the drawings there are here respectively shown two forms of regenerators each being incorporated in a glassworks furnace.

As shown in the drawings air passes through the left hand checker-work chamber 22' whilst fumes pass through the righthand checker-work chamber 28'. The directions of flow are of course periodically reversed.

The air heated through contact with the checker-work system 22 of the left-hand regenerator passes into the ducts 23 where it undergoes either several changes of direction each through 90° as shown in FIGURE 5 or else at least one change of direction through 90° as shown in FIGURE 8, before arriving at the burners 24 where it is mixed with fuel, ignites and thereupon penetrates into the working chamber 25 of the furnace. The fumes pass out of the chamber 25 and through the burners 26 into the ducts 27 which terminate in the righthand regenerator 28 in a path of travel which corresponds to that which was imposed on them during their passage through the ducts 23 of the right-hand regenerator 22. They then pass into and through righthand checker-work system 28 whereupon they are evacuated via the duct 29 by the chimney.

It will be seen that in the cases illustrated in both FIGURES 5 and 6 the jets of fumes issuing from the ducts 27 are spread out by the baffle wall 30 and pass to the upper portion of the chamber 28' in the form of a continuous sheet of fumes, whereupon they are distributed uniformly over the whole exposed cross-sectional area of the checker-work system 28. This uniform distribution arises as a result of the reduction in the speed of the fumes and the decrease in cross-section of the free space left between the checker-work 28 and the vaulted wall of the checker-work chamber 28'.

Dust-separating chambers 31 are provided below the ducts 23 and 27.

Referring to FIGURES 7 and 8 of the drawings, the fumes issuing from a working-chamber 25 of the furnace via burners 32 pass through ducts 33 into a dust-separating chamber 34. Slag and dust borne by the fumes are deposited there owing to the increase in the cross-section of passage and to the sudden change in direction to which the fumes are subjected to upon issuing from the dust-separating chamber 34. This dust is removed from the chamber 34 via a duct 35. The chamber 34 extends along the whole length of the working chamber. However, transverse positions may be provided at intervals thereby rendering it possible to isolate the fumes of burners or of groups of burners with a view to facilitating the separate regulation thereof.

Upon issuing from the chamber 34, the fumes pass through a series of apertures 36 formed in the wall which separates the chamber 34 from the regeneration chamber 37.

The fumes which pass vertically downwards from the series of ducts 33 are mixed together by diffusion when they enter the common chamber 34. In passing through the apertures 36 the fumes are directed horizontally and perpendicularly to the longitudinal axis of the furnace. They then strike a baffle wall 38 formed in a checker-work chamber 37.

It should be understood that as used in the present invention the baffle walls 16, 21, 30 or 38 do not bear any structural load. Their function is to protect the checker-work system against the direct action of the jets of fumes and also to cause the latter to spread out into a continuous uniform sheet of fumes along the whole length of the checker-work chamber.

The height of the baffle walls must not of course be so great they extend as far as the vaulted wall of the checker-work chamber. Thus the baffle walls may extend to the upper level of the checker-work system or they may extend somewhat beyond this level, as shown by way of example at 42 in FIGURE 8. This part 42 of the baffle wall 38 has the effect of reflecting the heat being radiated issuing from the hottest parts of the construction. Moreover the impact which the fumes undergo upon encountering the baffle walls promote the deposition of dust and improves the heat exchange between fumes and refractory materials.

Finally, the baffle wall 38, situated longitudinally in the chamber 37, may be reinforced at intervals by buttresses 41 so arranged that the sheet of fumes formed by the baffle wall retains substantially its continuous form.

It will also be seen that the baffle wall separates the chamber 37 into two parts, the larger of which encloses the checker-work system 40 of refractory bricks, these two parts communicating freely through an opening in which there is no obstruction.

The fumes are thus caused to pass to the upper portion of the chamber 37 where they strike the vaulted wall 39, which reflects them into a substantially horizontal direction so as to cover uniformly the whole exposed cross-sectional area of the checker-work system 40, whereupon the fumes penetrate into the checker-work 40 in the downward direction and distributed uniformly over the whole cross-sectional area of the checker-work 40.

It will be noted that the apertures 36 are not situated directly adjacent and opposite the ducts 33 but halfway between adjacent pairs of ducts 33. This creates an additional change of direction of flow for the fumes.

In effect the fumes travel as follows: Horizontally when issuing from the furnace and then downwardly through the ducts 33 into the chamber 34, then horizontally from front to rear and from rear to front through the chamber 34 to the aperture 36 situated at the right and left of each duct 33, thereby causing adjacent currents to mix together. The fumes then more horizontally and transversely through the apertures 36 striking the baffle wall 38 and spreading out into a continuous sheet along the length of the crecker-work system 40. This continuous sheet moves upwards along the baffle wall 38 and then transversely and gradually downwards along the vaulted wall thus forming a continuous sheet of fumes transversely of the exposed entry surface of the checker-work 40, with gradual diffusion through the checker-work 40.

The cross-section of a spreading-out duct 43 formed between the baffle wall 38 and the wall 44 of the furnace may advantageously be progressively reduced so as to have the effect of throttling the flow of fumes and thus promoting the heat exchange between the latter and the masonry of the checker-work chamber.

It will be understood that modifications may be made to the various features which have been described and illustrated without departing from the scope of the invention.

I claim:
1. A process for the recovery of heat in fumes from combustion in an industrial furnace and in which solid particulate material is carried in suspension, which comprises burning combustible material and advancing the resulting fumes in a working chamber of the furnace wherein solid particulate material is brought into suspension in such fumes, passing the mixture of fumes and suspended solid particulate material out of such working chamber and into the entry ends of elongated separated passageways which conduct the fume mixture as discrete currents toward a mixing chamber remote from such working chamber, directing currents of the fume mixture conducted by the passageways through a wall portion of the mixing chamber and against an obstructing surface positioned in the mixing chamber in spaced relation to the place of entry of such fume mixture through such wall portion into the mixing chamber and disposed transversely to the direction of travel of the currents of fume mixture entering such mixing chamber, so that each of the entering currents is abruptly broken up and a substantial part at least of the solid particulate material carried in suspension by said entering currents is caused to deposit, then forcing the spread, diffused fumes of such broken currents to rise in the mixing chamber so that they pass up from the place of entry of the fume mixture into such chamber as a single consolidated current in a direction disposed substantially at right angles to the direction of travel of said entering currents and so as to bring about a thorough homogenization of the fumes from the several currents and the removal therefrom of substantially the balance of the suspended solid particulate material, collecting the solid particulate material deposited when the entering currents of fume mixture are abruptly broken up and when the diffused fumes thereof are forced to pass up the mixing chamber as a single consolidated current, at a common place of discharge below the place of entry of the fume mixture into the mixing chamber to enable withdrawal of the particles arriving thereat from the mixing chamber, and then changing the consolidated column as it passes up through the upper discharge end of the mixing chamber so that the homogenized fumes thereof are directed toward the entry surface of a refractory checker-work system.

2. A process for the recovery of heat in fumes from combustion in an industrial furnace and in which solid particulate material is carried in suspension, which comprises burning combustible material and advancing the resulting fumes in a working chamber of the furnace wherein solid particulate material is brought into suspension in such fumes, passing the mixture of fumes and suspended solid particulate material out of such working chamber and into the entry ends of elongated separated passageways which conduct the fume mixture as discrete currents toward a place of discharge in a wall portion of a common mixing chamber which is located at a place remote from such working chamber, directing the currents of fume mixture emitted through such wall portion at the place of discharge into the mixing chamber against a wall therein spaced from the discharge ends of the passageways and disposed transversely across the place of discharge so that the separate currents of fumes entering the mixing chamber strike said transverse wall substantially perpendicularly to cause an abrupt breaking up of each of the currents thereof entering such chamber, the deposit from such fumes of a substantial part at least of said suspended solid particulate material, and an active intermixture of the diffused fumes from several of such currents, then forcing such intermixed fumes to rise as a single consolidated current in said mixing chamber so that they pass up from said place of discharge and in a direction disposed substantially at right angles to the direction of impact of said fumes against the transverse wall and so as to bring about a thorough homogenization of the fumes from the several currents and the removal therefrom of substantially the balance of said suspended solid particulate material, collecting the solid particulate material deposited when the currents of fume mixture are abruptly broken up and when the diffused fumes are forced to pass up the mixing chamber as a single consolidated current, at a common place of particle discharge located below said place of fume discharge to enable withdrawal of the particles arriving thereat from the mixing chamber, and continuing the rise of such single current of fumes until it is above the entry surface of a refractory checker-work system, and then changing the rising column so that the homogenized fumes thereof descend to such entry surface and enter such system substantially uniformly.

3. A process such as defined in claim 1, in which the direction of travel of the fume mixture from the working chamber of the furnace and before such mixture reaches the place of entry thereof into the remote mixing chamber is changed to an extent sufficient to cause the deposit from the fume mixture of at least a part of the suspended solid particulate material prior to the entry of such mixture into the mixing chamber, and collecting the particulate material so deposited at a place of discharge therefor to enable withdrawal of the particles arriving thereat from the fume mixture prior to the discharge of the latter into the mixing chamber.

4. A process such as defined in claim 1, in which a flow of fume mixture from the working chamber of the industrial furnace is divided into a plurality of divisional currents which are conducted as discrete currents along said elongated separated passageways toward the place of entry thereof into the remote mixing chamber and then such divisional currents are so reunited with such change of direction as to cause deposit of at least a part of the suspended solid particulate material carried by such divisional currents prior to the entry of the reunited currents into said mixing chamber, and collecting the particulate material so deposited at a place of discharge therefor to enable withdrawal of the particles arriving thereat from the place at which such divisional currents are reunited.

5. A process such as defined in claim 1, in which discrete currents of fume mixture are discharged into the mixing chamber at such small distances from each other that as such currents are broken up by said obstructing surface in said mixing chamber, the diffused fumes of such broken currents are intimately mixed with one another.

6. Apparatus for the recovery of heat in fumes from combustion in an industrial furnace and in which solid particulate material is carried in suspension, comprising a furnace having means for burning combustible material and a working chamber in which the resulting fumes are advanced and wherein solid particulate material is brought into suspension in such fumes, a mixing chamber remote from said working chamber and having a wall portion, fume mixture conducting means including a plurality of elongated separate passageways extending between said furnace working chamber and said remote mixing chamber, the entry ends of said passageways communicating with said furnace working chamber so that the mixture of fumes and suspended solid particles pass out of such working chamber and into said passageways for conduction as discrete currents towards said remote mixing chamber, the discharge ends of said passageways being in communication with said mixing chamber through a wall portion of the latter so that currents of the fume mixture delivered by said passageways pass through such wall portion and into said mixing chamber, said mixing chamber being provided with an obstructing surface positioned therein in spaced relation to the place of entry of such currents of fume mixture through such wall portion into said mixing chamber and disposed transversely to the direction of travel of such entering currents of fume mixture, so that each of such entering currents is abruptly broken up and a substantial part at least of the solid particulate material carried in suspension by said entering currents is caused to deposit, said mixing chamber having a passageway extending above the place of entry in such wall portion thereof and configured to force the spread, diffused fumes of such broken currents to rise so that they pass up from such place of entry as a single consolidated current in a direction disposed at right angles to the direction of travel of said entering currents and so as to bring about a thorough homogenization of the fumes from the several currents and the removal therefrom of substantially the balance of the suspended solid particulate material, means located below said place of entry and in communication with said mixing chamber and the passageway thereof for collecting the solid particulate material deposited when the entering currents of fume mixture are abruptly broken up by said obstructing surface and when the diffused fumes thereof are forced to pass up said chamber passageway as a single consolidated current and enabling the withdrawal of the particles arriving thereat from the mixing chamber and its said passageway, means defining a regenerator chamber having contained therein a refractory checker-work system provided with a fume entry surface, and means at the upper discharge end of said chamber passageway for changing the consolidated column of fumes as it discharges from the latter so that the homogenized fumes of such column are directed toward the entry surface of said checker-work system.

7. Apparatus for the recovery of heat in fumes from combustion in an industrial furnace and in which solid particulate material is carried in suspension, comprising a furnace having means for burning combustible material and a working chamber in which the resulting fumes are advanced and wherein solid particulate material is brought into suspension in such fumes, a common mixing chamber remote from said working chamber and having a wall portion, means including a plurality of elongated separate passageways extending between said furnace working chamber and said remote mixing chamber, the entry ends of said passageways communicating with said furnace working chamber so that the mixture of fumes and suspended solid particles pass out of such work chamber and into said passageways for conduction as discrete currents toward a place of discharge in a wall portion of said mixing chamber, the discharge ends of said passageways being in communication with said mixing chamber through said wall portion thereof at said place of discharge so that currents of the fume mixture delivered by said passageways pass through such wall portion and into said mixing chamber, said mixing chamber having a second wall portion positioned in spaced relation to said first wall portion and disposed transversely to the direction of travel of such entering currents of fume mixture, so that each of such entering currents strike said second wall portion substantially perpendicularly and is abruptly broken up soon after entry into such chamber to cause an active intermixture of the diffused fumes from the several currents and the deposit from such fumes of a substantial part at least of the suspended solid particulate material, said mixing chamber having a passageway extending above the place of entry in said first wall portion thereof and configured to force the intermixed fumes to rise as a single consolidated current from said place of discharge and in a direction disposed substantially at right angles to the direction of impact of the fumes against said second wall portion and so as to bring about a thorough homogenization of the fumes from the several currents and the removal therefrom of substantially the balance of the suspended solid particulate material, means located below said place of discharge and in communication with said mixing chamber and the passageway thereof for collecting the solid particulate material deposited when the entering currents of fume mixture are abruptly broken up and when the diffused fumes thereof are forced to pass up said chamber passageway and enabling the withdrawal of the particles arriving thereat from the mixing chamber and its passageway, means defining a regenerator chamber having contained therein a refractory checker-work system provided with a fume entry surface, and means at the discharge end of said mixing chamber passageway for changing the current of fumes emerging therefrom so as to cause the homogenized fumes thereof to be directed toward such entry surface and enter said checker-work system substantially uniformly.

8. Apparatus such as defined in claim 6, in which said means composed of said elongated separate passageways for conducting the mixture of fumes toward said remote mixing chamber is so constructed and arranged that the mixture of fumes traveling therethrough is caused to make such change in its direction of travel at a given place in advance of said mixing chamber as to cause the deposit from such fume mixture of at least a part of the suspended solid material prior to the entry of the fume mixture into said mixing chamber, and including means for collecting the solid particles so deposited at such given place and enabling the withdrawal of the particles arriving thereat from such fume mixture prior to the discharge of such mixture into said mixture chamber.

9. Apparatus such as defined in claim 6, in which a plurality of said elongated, separate passageways are so constructed and arranged and are in such communication with said working chamber of the furnace as to cause a flow of a mixture of fumes from the latter to be divided into a plurality of divisional currents, and in which said conducting means includes means for so reuniting such divisional currents with such change in direction as to cause deposit of at least a part of the suspended solid particulate material carried by the divisional currents prior to the entry of the reunited currents into said mixing chamber, and including means for collecting the solid particles so deposited and enabling the withdrawal of the particles arriving thereat from the portions of the fume mixture passed through said reuniting means.

10. Apparatus such as defined in claim 6, in which said conducting means terminate at said place of discharge in a plurality of discharge openings formed in said wall portion of said mixing chamber and in such closely placed relation that the fume currents discharged from such wall openings are sufficiently close to enable the fumes thereof to intimately mix with one another when such currents are broken up by said obstructing surface.

11. Apparatus such as defined in claim 6, in which said means for conducting the mixture of fumes toward said remote mixing chamber, includes at least one common chamber for preliminarily mixing a plurality of the currents of said fume mixture conducted by said passageways prior to the discharge thereof into said remote mixing chamber, a plurality of said passageways having their discharge ends communicating with said preliminary mixing chamber so that the currents of fume mixture discharged by said passageways are intermixed in said preliminary mixing chamber, means for collecting the solid particles deposited by said currents of fume mixture during the intermixture of such currents in said preliminary mixing chamber, and means providing for the passing of said intermixed fumes from said preliminary mixing chamber to said remote mixing chamber.

12. A process for the recovery of heat in fumes from combustion in a glass making furnace, which comprises burning combustible material in a multiplicity of separate burners in said furnace and advancing the resulting fumes in the working chamber of the furnace wherein solid particulate material is brought into suspension in such fumes, passing the mixture of fumes and suspended solid particulate material out of such working chamber and into the entry ends of elongated separated passageways, which conduct the fume mixture as discrete currents toward a common mixing chamber which is located at a place remote from said working chamber and which has a wall portion providing a place of discharge for such fume mixture, and at said place of discharge discharging separate currents of the conducted fume mixture into the mixing chamber at relatively small distances from each other and against a transverse obstructing wall spaced a short distance from the wall portion providing said place of discharge and so that each of the separate entering currents of fume mixture is abruptly broken up and the spread, diffused fumes therefrom are actively intermixed with the spread, diffused fumes of the other broken up entering currents, and a substantial part at least of the solid particulate material carried in suspension by said entering fume mixture currents is caused to deposit, then forcing the intermixed fumes of all of the currents to rise in the mixing chamber between the chamber wall providing the place of discharge and said obstructing wall as a single current which has a greater width than either of the entering currents and a smaller cross-sectional area than the area of the exposed entry surface of a refractory checker-work system and which is caused to flow up from said place of discharge in a direction lateral to the direction of impact of said entering currents against said obstructing wall so as to bring about a thorough homogenization of the fumes from the several currents and the removal therefrom of substantially the balance of the suspended solid particulate material, collecting the solid particulate material deposited when the currents of fume mixture are abruptly broken up and when the diffused fumes are forced to pass up the mixing chamber as a single consolidated current, at a common place of particle discharge located below said place of fume discharge to enable withdrawal of the particles arriving thereat from the mixing chamber, and continuing the rising flow of such single current of combined fumes until it is above said entry surface of the refractory checker-work system, and then changing said single current so as to cause it to descend toward such entry surface and enter into and flow through said checker-work system as a stream having an overall cross-sectional area substantially equal to the area of the entire exposed entry surface of such system.

13. Apparatus for the recovery of heat from combustion in a glass melting furnace, comprising means defining a regenerator chamber having disposed in it a refractory checker-work system, means for directing the fumes into said regenerator chamber, a common mixing chamber for said fume currents having a wall and communicating with said directing means, a multiplicity of burners for burning combustible material in said furnace and said furnace having a working chamber in which the resulting fumes of combustion are advanced and wherein solid particulate material is brought into suspension in such fumes, said common mixing chamber being remote from said working chamber, means for conducting the fume currents from said working chamber along separate isolated paths toward said mixing chamber and for discharging such currents into such mixing chamber through separate discharge openings in said wall of said mixing chamber and spaced at relatively small distances from each other, means associated with said chamber providing a substantially continuous deflecting surface for all of said currents of fume mixture discharged through said openings and disposed in such opposed, spaced relation to said discharge openings in said wall and at such distance from said wall containing such openings that such fume currents from said openings strike such deflecting surface substantially perpendicularly and are abruptly broken up to cause an active intermixture of the diffused fumes from the several currents and the deposit from such fumes of a substantial part at least of the solid particulate material carried in suspension by said currents, said mixing chamber being configured to force the intermixed fumes to form a single substantially continuous rising sheet of fumes which has a width greater than the width of either of the discrete currents discharged through said openings and a smaller cross-sectional area than the area of the exposed entry surface of said refractory checker-work system, and to cause said sheet of fumes to travel upwardly from said discharge openings in a direction at right angles to the direction of impact of the fumes against said deflecting surface to a point above said checker-work system and so as to bring about a thorough homogenization of the fumes from the several currents and the removal therefrom of substantially the balance of the suspended solid particulate material in such fumes, means located below said discharge openings and in communication with said mixing chamber for collecting the solid particulate material deposited when the entering currents of fume mixture are broken up by said deflecting surface and as said sheet of fumes passes up from said discharge openings, and enabling the withdrawal of the particles arriving thereat from said mixing chamber, said directing means being formed to change such sheets of fumes from said mixing chamber so as to cause it to flow down into and through said checker-work system as a stream having an overall cross-sectional area substantially equal to the area of the entire exposed entry surface of said checker-work system.

14. Apparatus according to claim 13, wherein said substantially continuous deflecting surface is provided on a vertical wall separating said refractory checker-work system from said common mixing chamber and wherein said spaced discharge openings are formed and substantially horizontally aligned in a wall portion of said mixing chamber, said vertical wall being arranged relative to said wall portion so that it extends substantially continuously across said discharge openings and substantially normally to the paths of travel of the fume currents entering the mixing chamber through such discharge openings, said mixing chamber and directing means communicating one with the other at the upper portion of said mixing chamber remote from such discharge openings, and said directing means having a chamber roof disposed transversely to said vertical wall and spaced above said checker-work.

15. Apparatus for the recovery of heat from discrete fume currents coming from a multiplicity of burners in a glass melting furnace comprising means defining a regenerator chamber having disposed in it a refractory checker-work system, means for conducting the fume currents from said plurality of burners to said system and including a plurality of separate passageways for conducting the fume currents along separate isolated paths from said burners and having discharge openings arranged in spaced aligned relation at a place spaced from said system, means at such place disposed in the path of travel of the currents emitted from such discharge openings and providing for all of such currents a deflecting surface adapted to diffuse each current and to intermix the diffused portions of such current with the diffused portions of the other currents and to form from such diffused and intermixed currents a single substantially continuous sheet of fumes which has a width greater than the width of either of the discrete currents and a smaller cross-sectional area than the area of the exposed entry surface of said refractory checker-work system, and directing means for changing such sheet of fumes so as to cause it to flow through said system as a stream having an overall cross-sectional area substantially equal to the area of the entire exposed entry surface of said checker-work system.

16. A process according to claim 12, which comprises dividing each discrete fume current into two component currents, and mixing each component current with an adjacent component current of the adjacent fume current.

17. A process according to claim 16, which comprises deflecting each pair of component fume currents to be mixed toward one another, each through an angle of 90°, and directing the mixed current along a common path of travel.

18. Apparatus according to claim 13, wherein said deflecting surface is constituted by at least one plate disposed in a free space of said chamber between the upper surface of the checker-work system and the roof of said chamber and transversely to the direction of entry of the fumes into said free space.

19. Apparatus according to claim 13, wherein the upper exposed entry surface of said checker-work system inclines towards the roof of said regenerator chamber in the direction of travel of said fumes.

20. Apparatus according to claim 13, wherein a first set of ducts are provided in communication with furnace burners through which said fumes may pass, said ducts terminating in a collecting chamber, a further set of ducts leading from said collecting chamber to said regenerator chamber, each opening of said first set of ducts into said collecting chamber being disposed between and in opposed relation to an adjacent pair of openings of said further set of ducts leading out of said collecting chamber.

References Cited in the file of this patent

UNITED STATES PATENTS

| | | |
|---|---|---|
| 311,190 | Lamond | Jan. 27, 1885 |
| 1,849,657 | Boynton | Mar. 15, 1932 |
| 2,420,373 | Hogberg | May 13, 1947 |
| 2,768,822 | Frey | Oct. 30, 1956 |
| 2,797,910 | Usmiani | July 2, 1957 |
| 2,813,708 | Frey | Nov. 19, 1957 |